UNITED STATES PATENT OFFICE.

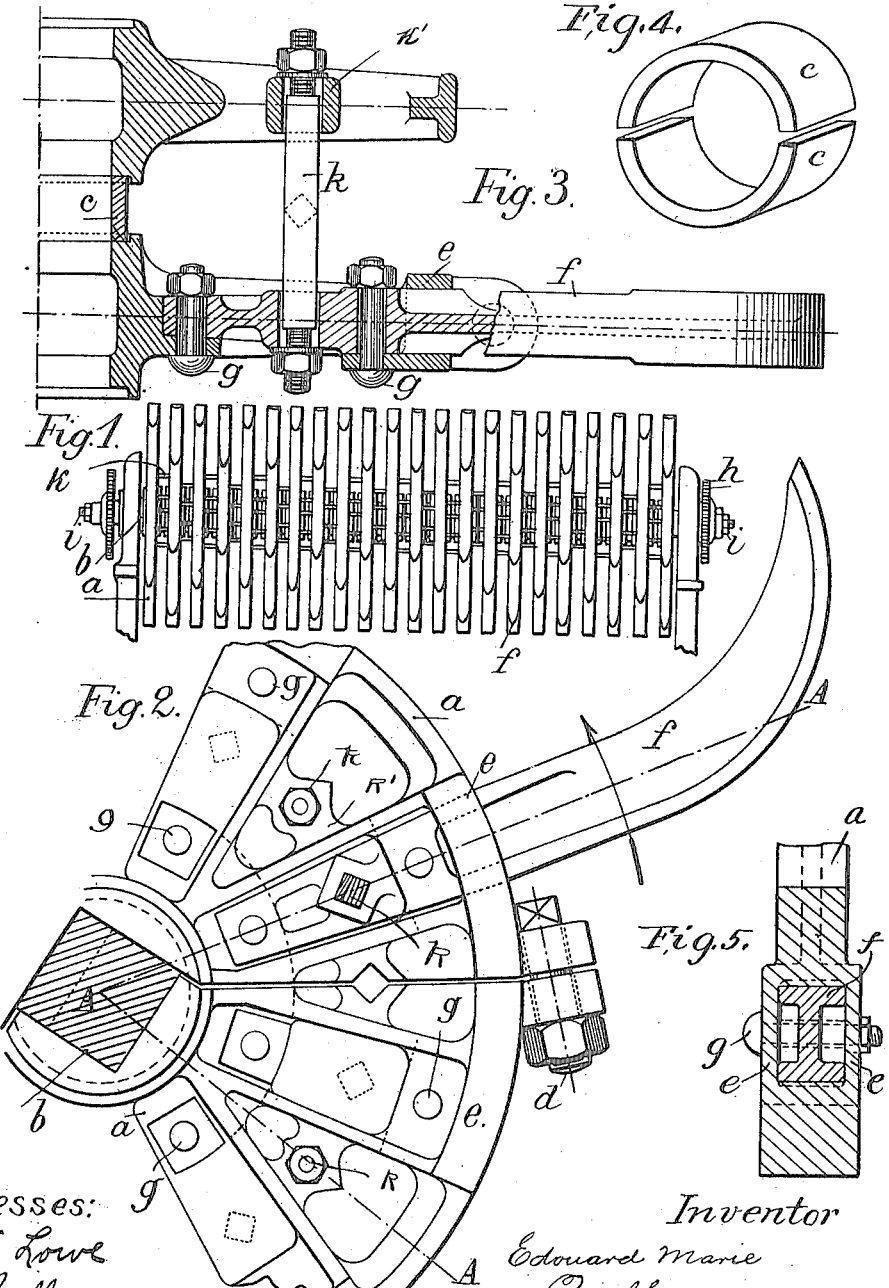

EDOUARD MARIE QUELLENNEC, OF PARIS, FRANCE.

DIGGER FOR SELF-PROPELLED HARROWS.

1,207,792.  Specification of Letters Patent.  Patented Dec. 12, 1916.

Application filed April 30, 1910. Serial No. 558,561.

*To all whom it may concern:*

Be it known that I, EDOUARD MARIE QUELLENNEC, of 10 Rue de la Chaise, Paris, France, engineer, have invented a new and useful Improvement in Diggers for Self-Propelled Harrows, which improvement is fully set forth in the following specification.

My invention relates to improvements in plowing or digging machines, in which the shaft carrying the digging-teeth or plows is rotated; and the objects of my improvement are, first, to reduce the amount of time and labor spent in assembling and disassembling a plurality of parts of said machine; second, to provide a means for maintaining firmly in place a plurality of digger-supporting disks and rings, on the said shaft, in case the nuts on ends of the shaft should become loosened. I attain these objects by the mechanism illustrated in the accompanying drawing, in which—

Figure 1 is a top view of the machine; Fig. 2 is a side elevation, showing a portion of a disk; Fig. 3 is a vertical section of half of a disk on the line A—A—A, Fig. 2. Fig. 4 is a detailed view in perspective of one of the divided rings $c$, and Fig. 5 is a section through one of the sockets in which the diggers are mounted.

The shaft $b$ which is rectangular in cross-section, is provided at each end with a member, for example chain-wheel $h$, serving to rotate it, and nuts $i$ screwed on threaded ends of said shaft. Any method may be used for holding the shaft in position.

The disks $a$—$a$ are non-rotatably mounted upon the shaft $b$ side by side and separated by rings $c$—$c$ as shown in Fig. 1. Each disk $a$ as shown in Fig. 2 is divided diametrically into two separable parts, which in the present example are of unequal size and which are normally held firmly together on shaft $b$ by bolts $d$. Each disk $a$ has lateral annular flanges facing the adjacent disks, as shown in Fig. 3.

The rings $c$—$c$, a cross-section of one of which is shown in Fig. 3 are divided diametrically into two parts, mounted on said shaft $b$, between the disks $a$—$a$, and engaged by the flanges of the adjacent disks. The size of the rings may vary considerably in order to allow the disks to be set at different distances apart, for the purpose hereinafter described.

The disks $a$—$a$ and rings $c$—$c$ are held as a compact and substantial unit on shaft $b$ by bolts, one of which, $k$ is shown in Fig. 3, which extend from each intermediate disk in opposite directions and connect such intermediate disk, with the adjacent disks, on each side, said bolts being rectangular in cross-section, and each having nuts on both of its ends. In the present example each bolt is shown as extending at one end through a web $k'$ formed on a disk $a$, and at the other end through the stock of a digger socketed in an adjacent disk $a$. By turning down the nuts on the threaded ends of $k$, the disks $a$ are evidently held together solidly.

Each disk $a$ Fig. 2 is provided with a number of tapering sockets $e$—$e$, one side of each of which has a greater radial opening than the other. These sockets are spaced at regular intervals on the circumference of the disks. A harrow tooth or digger $f$ is fitted in each of the sockets $e$—$e$. Bolts $g$—$g$ as shown in Fig. 3 are passed through one side of said socket $e$ and through the said harrow tooth. By tightening the nut on said bolts $g$—$g$ the said side of socket $e$ is drawn in against the harrow tooth $f$, thus securing it substantially in socket $e$.

The harrow teeth or diggers are bent in such a manner as to easily penetrate into the soil on the rotation of the machine, the direction of rotation being the same as that of the driving wheels of the vehicle carrying the diggers. By this means the purchase of the harrow-teeth or diggers in the soil aids in the forward movement of the vehicle. The shape given the diggers is such that whatever may be the forward speed of the machine at work, within the limits of practice, none of the diggers drag on the ground.

By the combined forward and rotary movement of the harrow, each point of the diggers describes a cycloid in space which by reason of the possible relations in practice between the speed of rotation and the forward movement is for the portion entering the soil a looped cycloid. In order to prevent the diggers from dragging in the ground, it is only necessary that their outer surface and all the points which can enter the soil should be within the cycloid calculated for the maximum forward speed and for the minimum speed of rotation. The outer curvature of the harrow-teeth is such as to comply with this condition.

The choice of the digger tools or plows used, the speed of rotation of the harrow or digger device, the distance apart of the disks, etc., can be altered as rendered necessary by the nature of the soil and the depth of tillage.

Having thus fully described my invention what I claim is:—

1. In a rotary plowing machine, the combination with a shaft, of a plurality of disks mounted on said shaft, bolts extending from each intermediate disk in opposite directions and connecting such intermediate disk with one adjacent disk on each side independently of the other disks, means interposed between the disks for separating them, and a plurality of diggers removably secured to each disk.

2. In a rotary plowing machine, the combination, with a shaft, of a plurality of disks, mounted on said shaft, each disk being divided diametrically into two parts, means for securing said parts together, said disks having lateral annular flanges, facing the adjacent disks, and rings mounted on said shaft between the disks and engaged by the flanges of the adjacent disks, and a plurality of diggers secured to each disk.

3. In a rotary plowing machine, the combination, with a shaft, of a plurality of disks, mounted on said shaft, each disk being divided diametrically into two parts, means for securing said parts together, said disks having lateral annular flanges facing the adjacent diggers and rings mounted on said shaft between the disks and engaged by the flanges of the adjacent disks, said rings being divided diametrically into two parts, and a plurality of disks secured to each disk.

4. In a rotary plowing machine the combination, with a shaft, of a plurality of disks mounted on said shaft, each disk being divided diametrically into two parts, means for securing said parts together, said disks having lateral annular flanges facing the adjacent disks, bolts extending from each intermediate disk in opposite directions and connecting such intermediate disk with the adjacent disk on each side, rings mounted on said shaft between the disks and engaged by the flanges of the adjacent disks, said rings being divided diametrically into two parts, and a plurality of diggers, removably secured to each disk.

5. In a rotary plowing machine, the combination, with a shaft of a plurality of disks mounted on said shaft and adapted to carry plows or diggers, each disk comprising separable sections for ready removal of the disk from the shaft, and bolts extending from each intermediate disk in opposite directions and connecting such intermediate disk with one adjacent disk on each side independently of the other disks.

In testimony whereof I have signed this specification in the presence of two subscribing witnesses.

EDOUARD MARIE QUELLENNEC.

Witnesses:
H. C. COXE,
FREDERIC HARLE.

Copies of this patent may be obtained for five cents each, by addressing the "Commissioner of Patents, Washington, D. C."